United States Patent
Iida et al.

(10) Patent No.: US 6,464,485 B1
(45) Date of Patent: Oct. 15, 2002

(54) ULTRASONIC INJECTION MOLD FOR AN OPTICAL DISK

(75) Inventors: Tetsuya Iida, Tsurugashima (JP); Noriyoshi Shida, Tsurugashima (JP); Keiji Suga, Tsurugashima (JP); Kenichi Ishiguro, Yamanashi (JP); Yasunobu Higashika, Yamanashi (JP); Atsushi Sato, Ichihara (JP); Kunitoshi Katagiri, Ichihara (JP)

(73) Assignees: Pioneer Corporation, Tokyo (JP); Pioneer Video Corporation, Yamanashi (JP); Idemitsu Petrochemical Co., Ltd., Tokyo (JP)

(*) Notice: Subject to any disclaimer, the term of this patent is extended or adjusted under 35 U.S.C. 154(b) by 78 days.

(21) Appl. No.: 09/599,615

(22) Filed: Jun. 23, 2000

(30) Foreign Application Priority Data

Jun. 24, 1999 (JP) .......................................... 11-177615

(51) Int. Cl.$^7$ .............................................. B29D 17/00
(52) U.S. Cl. ..................... 425/174.2; 425/556; 425/810
(58) Field of Search ............................... 425/174.2, 556, 425/444, 810; 264/71, 106, 107, 442, 443, 478

(56) References Cited

U.S. PATENT DOCUMENTS

| | | | | |
|---|---|---|---|---|
| 5,017,311 A | * | 5/1991 | Furusawa et al. | ............ 264/443 |
| 5,458,818 A | * | 10/1995 | Kim et al. | ................. 264/1.33 |
| 5,792,492 A | * | 8/1998 | Takahashi | ................... 425/547 |

FOREIGN PATENT DOCUMENTS

| | | | |
|---|---|---|---|
| JP | 3-213317 | * | 9/1991 |
| JP | 8-267508 | * | 10/1996 |

* cited by examiner

*Primary Examiner*—James P. Mackey
*Assistant Examiner*—Donald Heckenberg
(74) *Attorney, Agent, or Firm*—Kanesaka & Takeuchi

(57) ABSTRACT

An ultrasonic injection mold for an optical disk includes a movable die and a fixed die; a disk molding cavity formed between the movable die and the fixed die; a stamper positioned at the bottom of the cavity for forming a pit on a surface of the disk; and an ultrasonic generation device provided on the movable die or fixed die for applying ultrasonic waves to the cavity in performing infection molding. One or more slits are formed on the movable die and the fixed die in the direction which crosses the radial direction of the cavity. The ultrasonic injection mold minimizes the amplitude of the ultrasonic transmitted in the radial direction of the cavity.

14 Claims, 8 Drawing Sheets

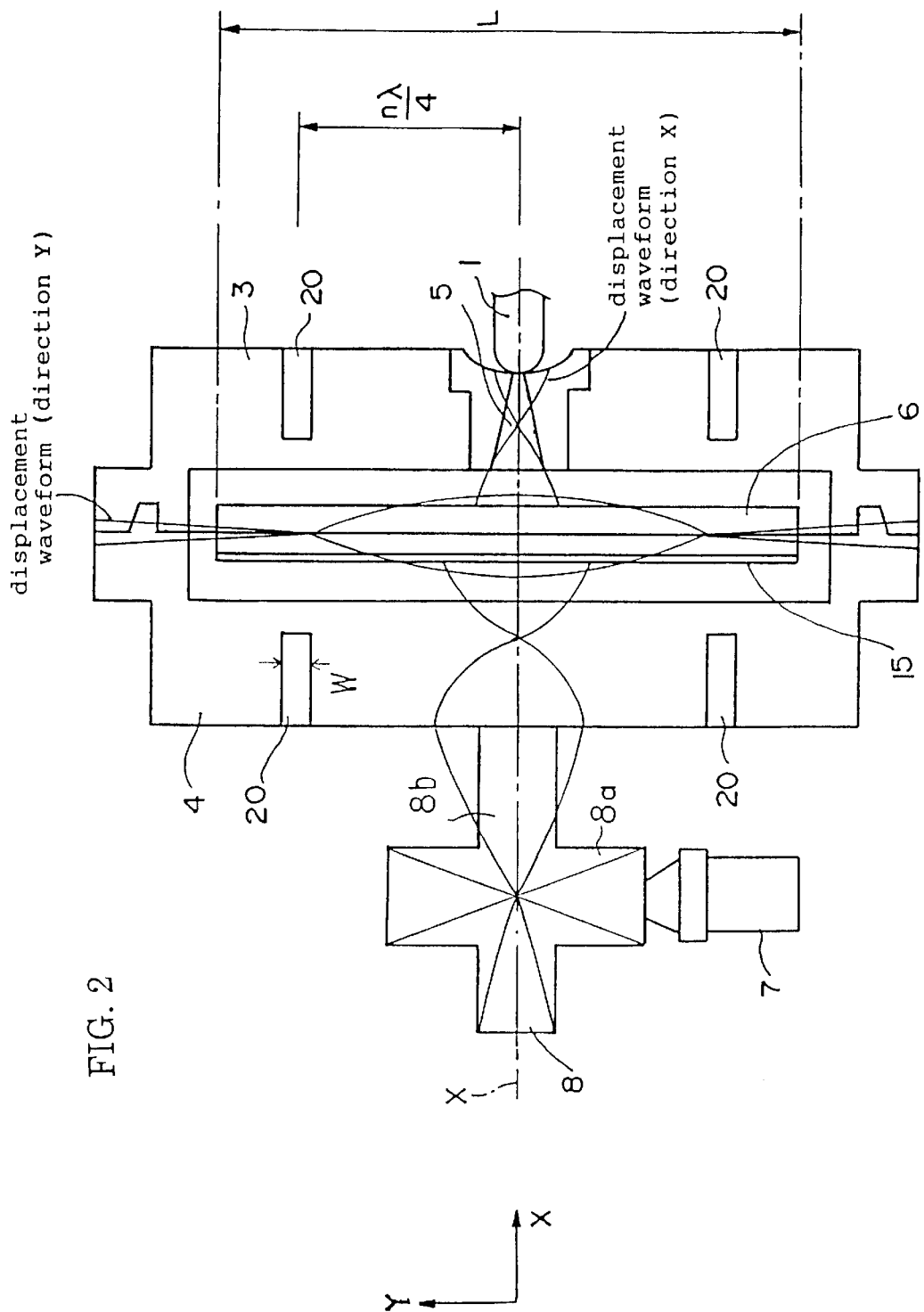

ULTRASONIC INJECTION MOLD FOR AN OPTICAL DISK

BACKGROUND OF THE INVENTION

1. Field of the Invention

The present invention relates to an ultrasonic injection mold for an optical disk. In particular, the present invention relates to an ultrasonic injection mold for an optical disk that has a good transferability and that can effectively prevent the optical disk from generating birefringence and warpage.

2. Description of the Prior Art

Optical disks such as CD's and DVD's are molded by injecting a resin such as melted polycarbonate into a mold. The mold comprises a movable die and a fixed die. A circular cavity is formed on the contacting surfaces of the movable die and fixed die for molding a disk. Further, on the bottom of the cavity, a stamper is positioned for forming convexes and concaves (a pit).

When a thin product such as an optical disk mentioned above is molded by injection, it is necessary to prevent a non-uniform filling by improving flowability of the melted resin being filled into the cavity so that defective products with shrinkage deformation and/or birefringence will not be manufactured. In order to prevent such defective products, in accordance with the injection molding method disclosed in Japanese Patent Laid-Open Application No. Hei10-661, the relationship between the equivalent diameter of the mold (D) and the amplitude of the ultrasonic oscillation ($\lambda$) is kept as D<0.6$\lambda$ while the injection molding is performed.

In the prior art ultrasonic molding method, however, since only the longitudinal oscillation is used, oscillation to be transferred in the radial direction is generated when the diameter of the surface where a cavity is formed so as to mold an optical disk (contacting surface of the fixed die and the movable die), which is usually 210 mm, is more than a half of the resonant wavelength of the ultrasonic, which is more than 130 mm at the frequency of 19 KHz in the case of SUS type mold. Therefore, it is impossible for the fixed portion of the mold and the mounted portion of the nozzle to be matched to the "node" of the oscillation (where the amplitude becomes zero) and it is difficult to maintain the mold and nozzle.

Also since only the longitudinal oscillation is used in the structure of the prior art ultrasonic mold, the whole mold comprising the movable die and fixed die needs to be at least one wavelength thick. Thus, the total thickness exceeds 400 mm when the oscillation direction converter is included, which makes it impossible to position this mold between the die plates of the production device (30 ton Injection molding device).

DISCLOSURE OF THE INVENTION

The present invention aims to provide an ultrasonic injection mold for injection molding an optical disk that will minimize the amplitude of the ultrasonic to be transferred in the radial direction of the cavity so that this mold will have a good transferability and will keep the mold itself and nozzle in appropriate states between the die plates while effectively preventing the generation of birefringence and shrinkage deformation.

The ultrasonic injection mold for an optical disk in accordance with the present invention comprises: a movable die; a fixed die; a cavity for molding a disk formed on the contacting surfaces of the movable die and fixed die; a stamper positioned at the bottom of the cavity for forming a pit on a surface of the disk; and an ultrasonic generation means provided on the movable die or the fixed die for applying ultrasonic to the cavity in performing infection molding, wherein one or more slits are formed in the regions of the movable die and fixed die in which the cavity is formed, the one or more slits being oriented in the direction which crosses the radial direction of the cavity.

Since the one or more slits make thinner the area where they are formed, the oscillation of that area is suppressed, thereby decreasing direction of the cavity.

The one or more slits are preferably formed at the distance of $n\lambda/4$ (n=1, 3, 5, . . . ) from the ultrasonic input portion where the ultrasonic is input into the movable die or fixed die, wherein $\lambda$ is the wavelength of the ultrasonic the transmitted direction of which is to be converted within the movable die or the fixed die. The "ultrasonic input portion" means to be such portions where the ultrasonic generation means or oscillation direction converter and the movable die or fixed die are contacted.

The amplitude of resonant oscillation becomes a node at $n\lambda/4$ (n=1, 3, 5, . . . ). The amplitude of the oscillation to be transferred in the radial direction will be kept to the minimum by positioning each of the slits at these nodes.

The ultrasonic generation means preferably generates oscillations throughout the whole bodies of the fixed and movable dies in the lateral direction or in the radial direction to be transmitted to the radial direction of the cavity as well as in the longitudinal direction. Thus, the thickness of each of the movable die and fixed die will be at least halved as compared to the case only the longitudinal oscillation is employed.

Further, a punch means may be provided on the movable die and oscillation direction converter or on the fixed die for punching an injection molded product at a predetermined position. This punch means may construct a product model means for extruding the product.

Furthermore, a supporting member is preferably inserted into the one or more slits so that the bottom of the one or more slits may be supported by one end of the supporting member in performing injection molding. In such an instance, it is preferable to keep t in the range of 0.1<t<0.3 mm where t is the distance between the supporting member and the internal wall of the one or more slits.

BRIEF DESCRIPTION OF THE DRAWINGS

FIG. 2 is a diagram explaining a displacement waveform to be transferred within the mold of FIG. 1.

BEST MODES FOR IMPLEMENTING THE PRESENT INVENTION

Figure 1:
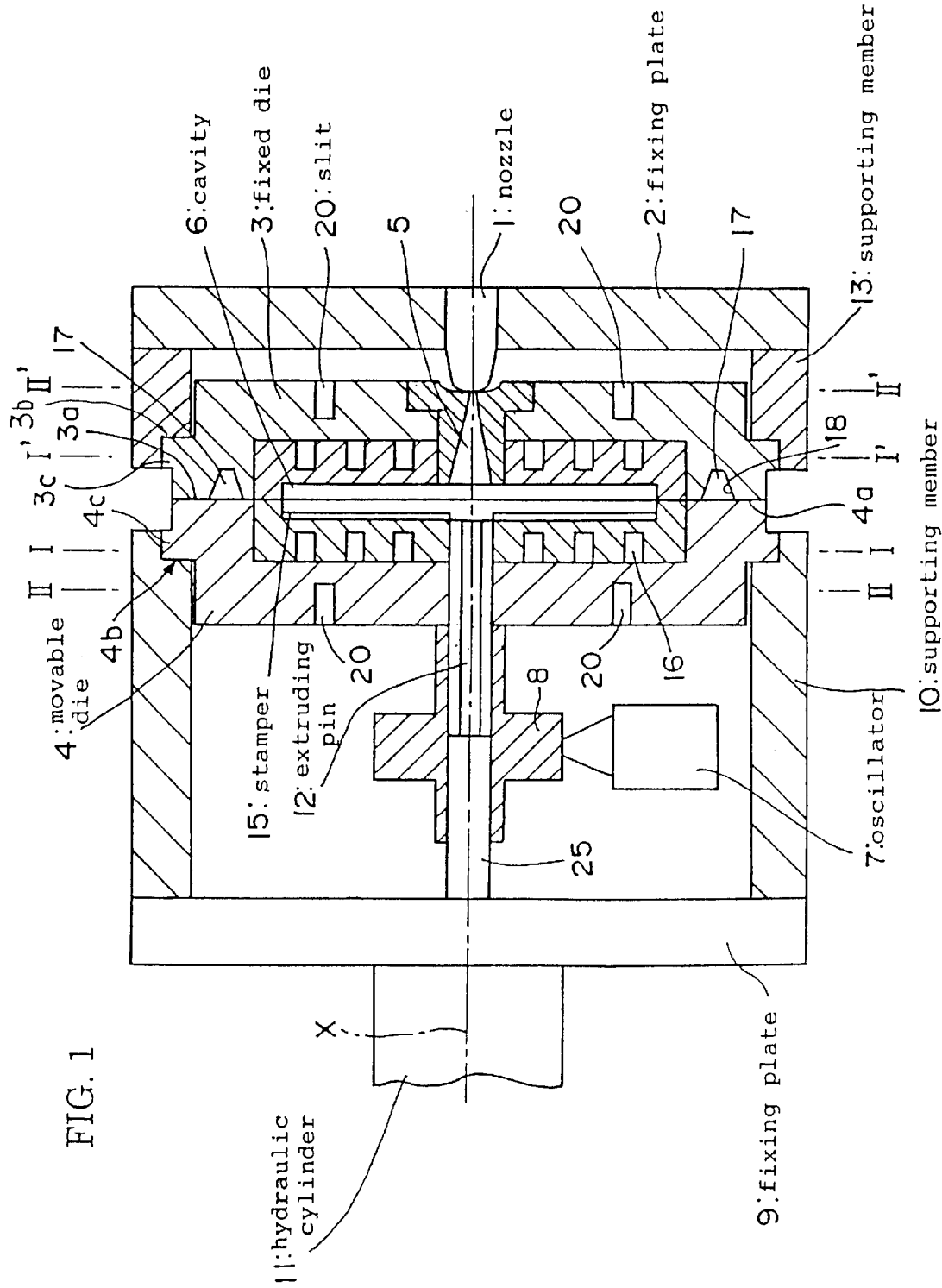
FIG. 1 is a partially cross-sectional schematic view of an ultrasonic injection mold for an optical disk in accordance with an embodiment of the present invention.

Preferred embodiments of an ultrasonic injection mold for an optical disk in accordance with the present invention will now be described by referring to the drawings.

However, the scope of the present invention will not be limited to the following embodiments but these embodiments can be modified in various ways without departing from the scope of the invention.

THE FIRST EMBODIMENTS

FIG. 1 is a partially cross-sectional schematic view of an ultrasonic injection mold for an optical disk in accordance with a first embodiment of the present invention. FIG. 2 is a diagram explaining a displacement waveform to be transferred within the mold of FIG. 1.

INJECTION MOLDING MACHINE

The injection molding machine to which the ultrasonic injection mold for an optical disk in accordance with the present invention can be applied includes all the ultrasonic injection mold for an optical disk wherein resin in the melted state is compressed into the mold, the resin is molded into a shape corresponding to that of the cavity, and taking it out of the mold.

In this injection molding machine in accordance with this embodiment, the fixed die 3 and the movable die 4, which will soon be described in details, are first clamped with no loads attached. Then, melted resin is injected from the nozzle 1 under a high pressure into the cavity 6 so that the fixed die 3 and the movable die 4 will be slightly separated from each other.

After this, compressive molding is performed with clamping pressure added to the movable die 4. After cooling off, the molded product is taken out. Ultrasonic is applied from the beginning of the resin injection until the cooling and when the product is taken out after the separation of the mold.

MOLD

As shown in FIG. 1, the ultrasonic injection mold for an optical disk in accordance with this embodiment comprises the fixed die 3 having the sprue 5 on the central axis X and the movable die 4 positioned as opposed to this fixed die 3.

The fixed die 3 is fixed onto the fixing plate 2 by a supporting member 13 while the movable die 4 is fixed onto the fixing plate 9 by the supporting member 10.

Further, the fixing plate 9 is attached to the end of the piston rod of the hydraulic cylinder 11. By translating the movable die 4 with respect to the fixed die 3 as well as translating the piston rod, the fixed die 3 and the movable die 4 are clamped and separated.

On the contacting surfaces 3a and 4a between the fixed die 3 and the movable die 4, the circular cavity 6 is formed so as to mold an optical disk. On the bottom of the cavity 6 at the side of the movable die 4, the stamper 15 is positioned so as to form convexes and concaves (pits) on the optical disk. Further, within the fixed die 3 and the movable die 4, the cooling channel 16 is formed around the cavity 6.

EXTERNAL FORMS OF MOLD

On each of the external ends of the fixed die 3 and the movable die 4, a stepped portions 3b and 4b are formed the thickness of each of which is narrowed (to X axis direction). The cross-sectional area of each of the stepped portions 3b and 4b is preferably related to that of each of the fixed die 3 and the movable die 4 that does not form the stepped portions 3b and 4b in the following manner.

It is preferable that the cross-sectional areas along lines II—II and II'—II' that go through each of the fixed die 3 and the movable die 4 that do not form the stepped portions 3b and 4b are 0.85 to 0.95 times as large as the cross-sectional areas along lines I—I and I'—I' that go through the stepped portions 3b and 4b.

Flange portions 3c and 4c are formed on the external sides of the stepped portions 3b and 4b. Each of the flange portions 3c and 4c is provided so as to fix each of the fixed die 3 and the movable die 4 to the fixing plate 2 and the fixing plate 9, respectively. In the stepped portions 3b and 4b, the amplitude of oscillations to be transferred in the radial direction of the cavity 6 is a node. Thus, the thickness of each of the flange portions 3c and 4c that is positioned at the outer side thereof should preferably be made as thin as possible. Considering the pressure to be applied to the flange portions 3c and 4c in clamping the mold, this thickness should preferable be 5 mm to 10 mm. Further, in order to decrease as little as possible the pressure that is imposed upon the flange portions 3c and 4c, the supporting member 10 and the supporting member 13 will preferably be in contact with the stepped portions 3b and 4b as well as with the flange portions 3c and 4c.

On the fixed die 3 and the movable die 4, slits 20 are formed from their sides facing the fixing plate 2 and the fixing plate 9 to the direction toward the cavity 6. These slits 20 are formed on the circumferences within radially oriented regions L (FIG. 2) of the fixed die 3 and the movable die 4 on which the cavity 6 is formed.

The slits 20 are formed where oscillating waves to be transferred in the radial direction of the cavity 6 will become a node. That is, the slits 20 are positioned at the distance $\lambda/4$ (n=1, 3, 5, . . . ) in the radial direction of the cavity 6 from the center of the cavity 6 on the x-axis that goes through the portion (ultrasonic input) where the oscillation direction converter 8 and the movable die 4 are contacted, and further slits 20 are positioned at the nearest position to the external end of the cavity 6. If the slits 20 are formed at this position, the oscillation will be most efficiently suppressed.

Width W of the slit 20 in the radial direction of the cavity 6 should preferably be 10 mm or less. And more preferably, it should actually be 0.1 or more so that the opposite open ends of the slits 20 will not be in contact with each other when the die 3 and 4 are oscillated. The depth of the slits 20 should preferably be more than half of the thickness of the die 3 and 4.

The form of the slots 20 and how the slits 20 are positioned with respect to the fixed die 3 and the movable die 4 are arbitrary. FIG. 3 gives a plan view of the mold showing the form of the slots 20 and how the slits 20 are geometrically positioned.

Figure 3A:
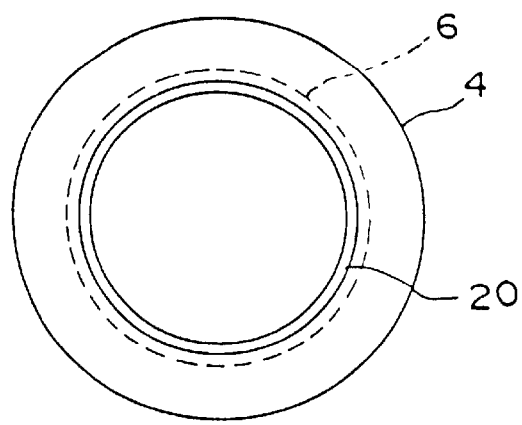
FIGS. 3(a)–3(c) are plan views of the mold indicating how the slots are positioned.

In the example of FIG. 3(a), a single slit 20 is formed as a ring that is concentric with the cavity 6.

Figure 3B:
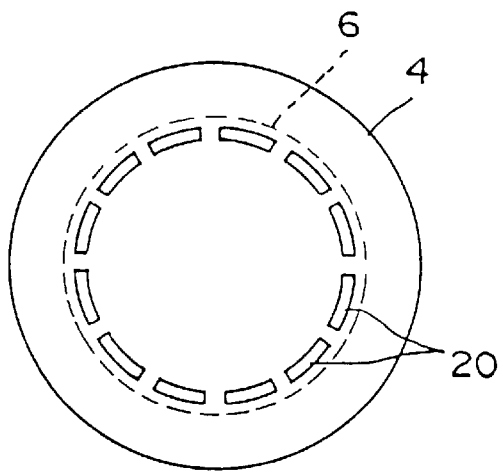

In the example of FIG. 3(b), the slit 20, which comprises equally divided portions of a circumference, is positioned in a concentric manner with respect to the cavity 6.

Figure 3C:
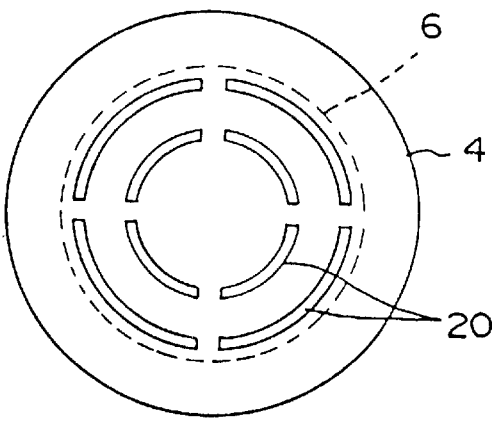

In the example of FIG. 3(c), a plurality of slits 20 are positioned in two rows at the different radii of $n\lambda/4$ (n=1, 3, 5, . . . ) in a concentric manner with respect to the cavity 6.

It is preferable, in the example of FIG. 3(c), that the most-internally positioned slit 20 is formed along a circle concentric to the cavity 6, the radius of which is n(/4 (n=1, 3, 5, . . . ).

Figure 4A:
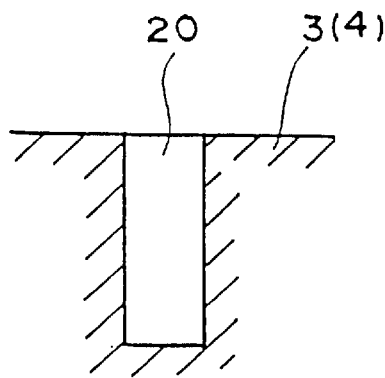
FIGS. 4(a)–4(c) are cross-sectional views of the slits.
Figure 4B:
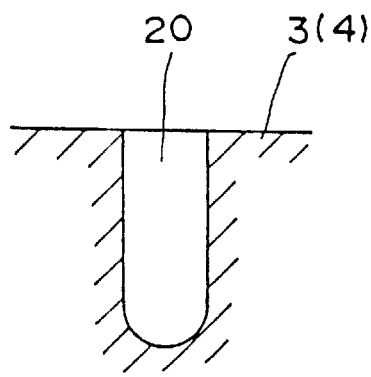
Figure 4C:
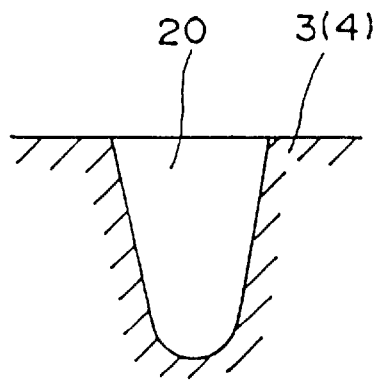

Preferably, the cross-sectional form of the slits 20 may conveniently be selected in response to the amplitude of oscillation and which metal is used to form the die 3 and 4. Although the slits 20 may be formed in such a manner that its cross-section is rectangularly shaped with its upper end being open as shown in FIG. 4(a), the slits 20 should preferably be Unshaped as shown in FIG. 4(b) so that no stress will be concentrated at the angles of the bottom of the slits 20. It is also possible to form the slits 20 with its sidewalls declined as shown in FIG. 4(*c*).

A nozzle 1 is connected to the inlet of the sprue 5 of the fixed die 3 so as to provide melted resin to the cavity 6. The resin to be injected from this nozzle 1 includes non-crystalline thermoplastic resin such as polycarbonate, polymethylmetacrynate and non-crystalline polyolefin used to manufacture optical disks.

HOW DIES ARE GUIDED TO BE OPENED AND CLOSED

In injection molding, the fixed die 3 and the movable die 4 have to be accurately positioned relative to each other. In clamping the mold, there are a guide-post method that uses a guidance means and a faucet method in order to accurately move the movable die 4 with respect to the fixed die 3.

The guidance means used in the guide-post method comprises (1) a guide-post (or guide-hole) provided on one of the fixed die 3 and the movable die 4 and (2) a guide-pin provided on the other of the fixed die 3 and the movable die 4 and going through the guide-post.

In the faucet method, into a conically shaped hole provided on one of the fixed die 3 and the movable die 4, a conically shaped pin provided on the other of the fixed die 3 and the movable die 4 is inserted.

The present inventors, as will be explained later, have performed an experiment to determine which of the guide-post method and faucet method is more efficient in suppressing oscillations. Consequently, we have found out that the faucet method is able to more efficiently suppress the oscillations at the nozzle connecting portion of the fixed die. Thus, in the mold of this embodiment, the convex portions 17 whose cross-sections are trapezoidal are continuously formed along a circumference around the cavity 6 on the contacting surface 4*a* of the movable die 4 while the concave portions 18 whose cross-sections are trapezoidal and into which the convex portions will be engaged are formed on the contacting surface 3*a* of the fixed die 3.

The maximum width of the tips of the convex portions 17 (those portions of convex portions that extrude out of contacting surface 4*a*) may be as much as 10 mm. Since the width of the tips should be minimized in order to keep small the oscillation amplitude of those portions of the nozzle 1 that are contact with the fixed die 3, however, it should preferably be 4–5 mm.

Incidentally, the convex portions 17 may be arbitrarily positioned as long as they are outside of the cavity 6. Also, the convex portions may be provided on either one of the fixed die 3 and the movable die 4 while concave portions may be provided on the other of the fixed die 3 and the movable die 4.

OSCILLATION DIRECTION CONVERTER AND OSCILLATOR

An oscillation direction converter 8 is provided on the central axis X of the surface of the movable die 4 that faces the hydraulic cylinder 11. The oscillation direction converter 8 orthogonally converts the oscillations inputted from the oscillation input surface to output the converted oscillations from the oscillation output surface. This oscillation direction converter 8 comprises two oscillating bodies 8*a* and 8*b*. The oscillator 7 is provided as a source of oscillation on the end surface of one 8*a* of the oscillating bodies that is orthogonal to the central axis X. Further, the end surface of the oscillating body 8*b* that is parallel to the central axis X is in contact with the movable die 4. The oscillation direction converter 8 should be preferably formed in such a manner that oscillating body 8*b* on the output side is slightly longer than the oscillating body 8*a* on the input side. By doing so, it will become possible to amplify the inputted oscillations from the oscillating body 8*a* so as to output the amplified oscillations from the end surface of the oscillating body 8*b*.

The oscillation direction converter 8 may be any multi-dimensional oscillation direction converter selected out of the L-L converter, the L-L-L converter and the R-L converter. The output of the oscillator 7 is preferably approximately 1.2 Kw. If the dies 3 and 4 are large, then the total output of the oscillator 7 may be three times larger than the R-L converter and providing a plurality of, for example, three oscillators 7 at the oscillation input end thereof.

The oscillations outputted from the oscillator 7 should preferably be those generating lateral oscillations or radial directional oscillations to be transferred in the radial direction of the cavity as well as longitudinal oscillations. By utilizing such composite oscillations, the thickness of the mold may be large.

The frequency generated by the oscillator 7 should be approximately 1 KHz to 1 MHz. Considering the noise and the output of the oscillators, it is preferable to output such ultrasonic of approximately 10 KHz to 100 KHz.

Further, the amplitude of the ultrasonic outputted from the oscillator 7 depends upon the fatigue strength to the ultrasonic oscillations of the metal that forms the fixed die 3 or the movable die 4. For example, the maximum amplitude will be approximately 20 $\mu$m for stainless type material, approximately 40 $\mu$m for a duralumin, and approximately 10 $\mu$m for a titanic alloys.

The oscillations generated by the oscillator 7 are converted by the oscillation direction converter 8 into the orthogonal direction. In this case, the oscillation direction converter 8 and the fixed die 3 may be positioned in such a manner that the contacting portion between the oscillation direction converter 8 and the fixed die 3 will be at the resonance belly of the oscillation. Also, the cavity 6 will be positioned at the resonance belly of the oscillation. Thus, the cavity 6 can be oscillated at the maximum amplitude so that the flow of the melted resin will be most appropriate.

PRODUCT SEPARATION MEANS

When a thin molded product with fine convexes and concaves (pits) provided on its surface is injection molded, it is preferable to employ a product separation means. The product separation means facilitates molded products to be more securely separated from the cavity 6 without side effects such as disordered pits.

In this embodiment, extruding pin 12 is fixed to fixing plate 9 as a product separation means. Further, the tip thereof extends through oscillation direction converter 8 and movable die 4 along central axis X as far as cavity 6. This extruding pin 12 is capable of translational movements by a cylinder (not shown) so that it will extrude the molded products within cavity 6 to take them out. Also, extruding pin 12 extrudes throughout the molded products by punching mechanism 25 when the molded products within cavities are processed to be extruded.

The above-mentioned extruding pin 12 that goes into and comes out of the cavity 6 in separating the mold is typical as a product separation means. However, other means such as a robot hand may be employed, thereby the molded products will be directly taken out.

The product separation means may vibrate movable die 4 or provide an air-blow in addition to vibrations. When a product separation means that provides vibrations is used, the convexes and concaves may be formed with higher density and disks capable of recording more information may be manufactured because it will no longer be necessary to form tapered shapes on the convexes and concaves of stamper 15.

Some experimental results will now be explained using comparative examples, wherein an ultrasonic injection mold for an optical disk in accordance with the first embodiment of the present invention is employed.

(1) The amplitude of each of several portions is measured in the first embodiment under such conditions wherein the fixed die 3 and the movable die 4 shown in FIG. 1 are used, the faucet method is employed as the guidance method in clamping and separating the mold, and the ultrasonic with the frequency of 19.5 KHz is outputted from the oscillator. The results are as follows:
The amplitude of the fixed portion of the movable die (vertical/horizontal): 0.79 $\mu$m/0.35 $\mu$m
The amplitude of the fixed portion of the fixed die (vertical/horizontal): 0.25 $\mu$m/0.11 $\mu$m
The amplitude of the connecting portion of the nozzle: 0.42 $\mu$m (2) As a first comparative example, the same fixed die and movable die as (1) without any slits are used. The faucet method is employed as the guidance method in clamping and separating the mold, and the ultrasonic with the frequency of 19.5 KHz is outputted from the oscillator. The measured results of the same portions as in (1) are as follows:
The amplitude of the fixed portion of the movable die (vertical/horizontal): 1.0 $\mu$m/10 $\mu$m
The amplitude of the fixed portion of the fixed die (vertical/horizontal): 0.35 $\mu$m/3.5 $\mu$m
The amplitude of the connecting portion of the nozzle: 9.0 $\mu$m The amplitude of each of the fixed portion in the horizontal direction and the connecting portion of the nozzle is large. Thus, the oscillation loss is substantially large. The oscillator 7 has been stopped because of its over-load state.

(3) As a second comparative example, the same mold as (1) are used. The guide-post method is employed as the guidance method, and the ultrasonic with the frequency of 19.5 KHz is outputted from the oscillator. The measured results of the same portions as in (1) are as follows:
The amplitude of the fixed portion of the movable die (vertical): 1.9 $\mu$m
The amplitude of the fixed portion of the fixed die (vertical): 1.7 $\mu$m
The amplitude of the connecting portion of the nozzle: 3.4 $\mu$m As seen above, since the amplitude of the connecting portion of the nozzle has become approximately eight times as large as in the case of (1), an inappropriate molding may occur by obtaining air from the nozzle 1.

As is clear from what has been described, if the slits 20 are provided on the fixed die 3 and the movable die 4 and the faucet method is employed as the guidance method, then it has been possible to lower the amplitude of the oscillations to be transferred in the radial direction of the cavity 6 and to manufacture the acceptable molded products.

SECOND EMBODIMENT

The second embodiment of the present invention will now be described by referring to FIG.5 and FIG. 6.

Figure 5:
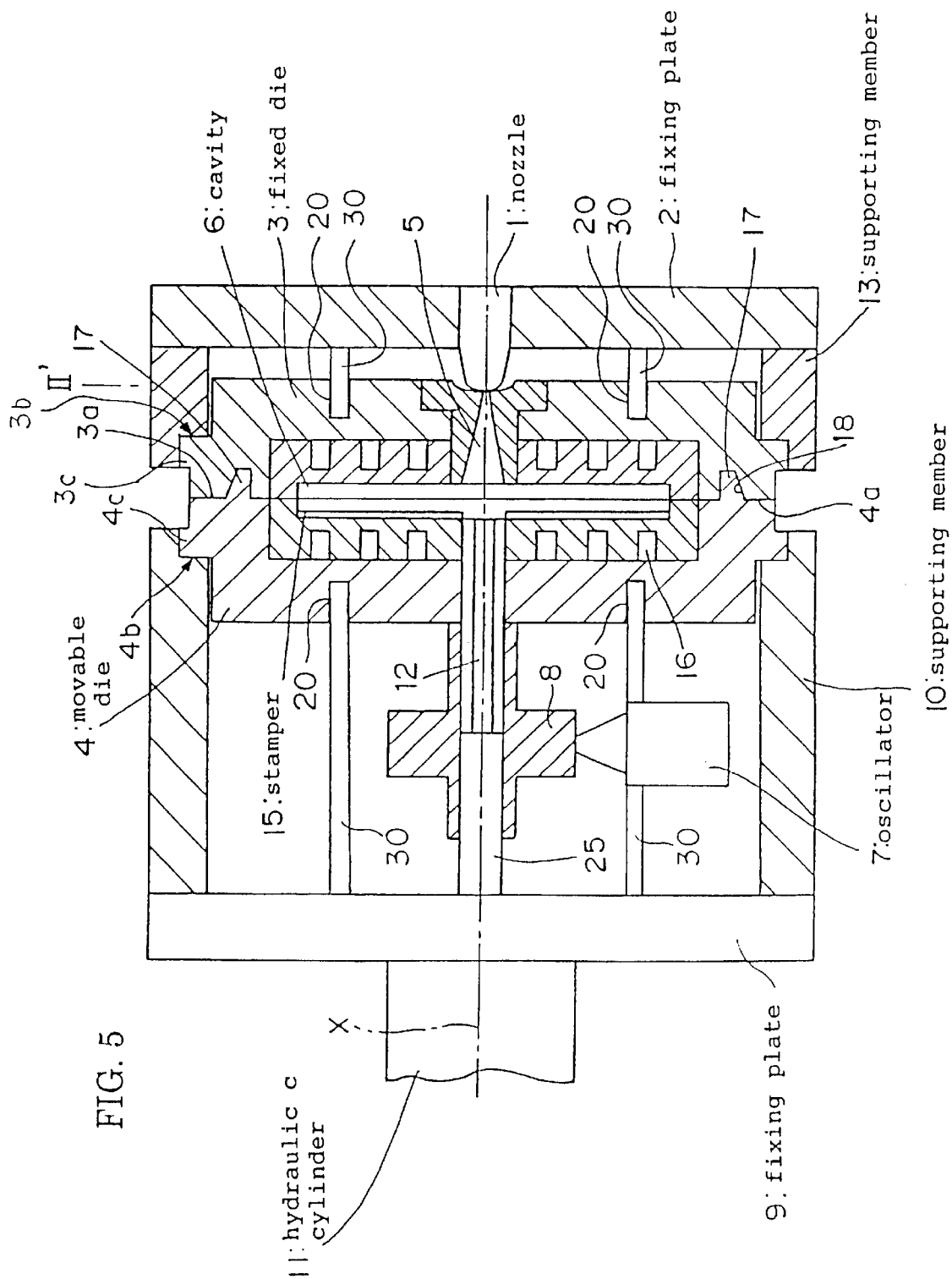
FIG. 5 is a partially cross-sectional schematic view of an ultrasonic injection mold for an optical disk in accordance with a second embodiment of the present invention.
Figure 6:
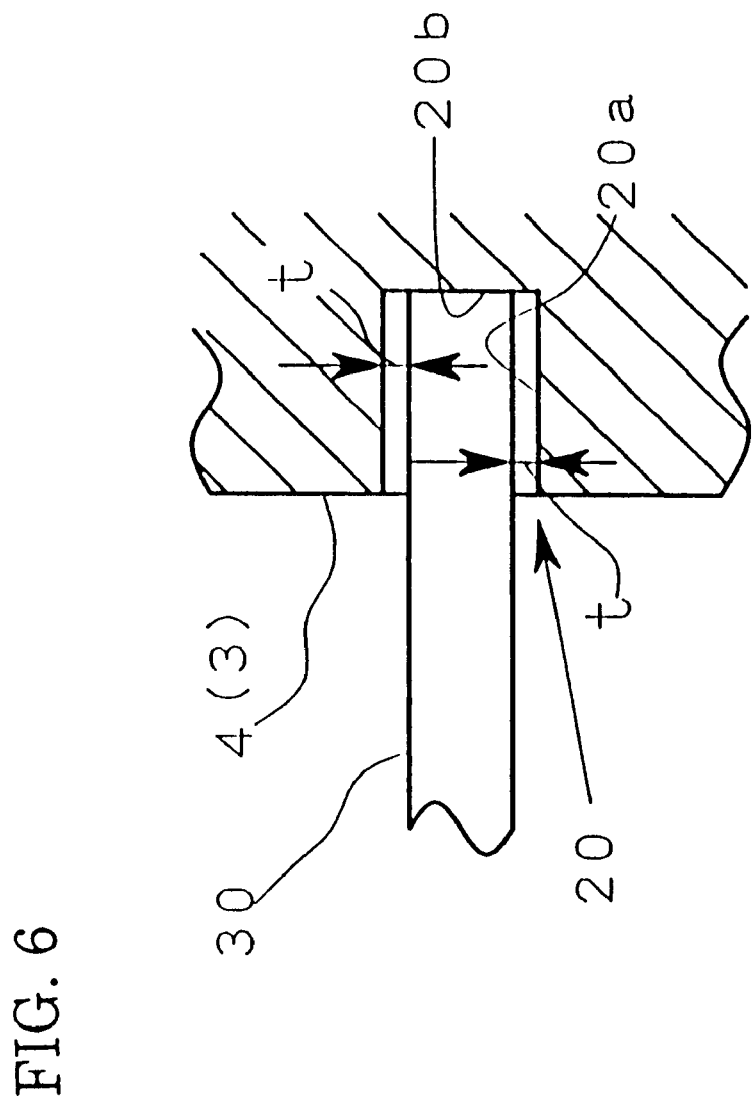
FIG. 6 is an enlarged view of a portion of the ultrasonic injection mold for an optical disk where a slit is provided.

FIG. 5 is a partially cross-sectional schematic view of an ultrasonic injection mold for an optical disk in accordance with a second embodiment of the present invention and FIG. 6 is an enlarged view of a portion of the ultrasonic injection mold for an optical disk where a slit is provided.

In this second embodiment, the portions provided with the slits 20 on the surface of the fixed die 3 and the movable die 4 are supported by the supporting members 30.

As in the fixed die 3 and the movable die 4, if the slits 20 are formed on the sides opposite from the regions where the cavity 6 is formed, then the amplitude of the oscillations may be effectively lowered in the radial direction. Since the thickness of the portions where the slits 20 are formed will thus be smaller, the fixed die 3 and the movable die 4 will tend to be more readily deflected because of the internal pressure of the cavity 6 in the injection molding. Such deflection of the mold may cause the thickness of the molded products to be varied. Thus, in this embodiment, the deflection of the die 3 and 4 is kept small by supporting the portions where the slits 20 are formed by the supporting members 30.

One end of each of the supporting members 30 is fixed onto the fixing plate 2 and the fixing plate 9 by bolts or welding while the other end of each of the supporting members 30 is in contact with the bottom 20b of the slits 20 of the fixed die 3 and the movable die 4.

As shown in FIG. 6, a slight gap is formed between the internal wall 20a of each of the slits 20 and each supporting members 30 so that the internal wall 20a will not be in contact with the supporting member 30. The width t of the gap is preferably such that the internal wall 20a and the supporting member 30 will not be contact with each other when the die 3 and 4 are oscillated, that is, more than 0.1 mm. Further, in order to keep the rigidity of the supporting member 30 to be as large as possible while the internal wall 20a of the slit 20 and the supporting member 30 are not in contact with each other when the die 3 and 4 are oscillated, the width t should be preferably less than 0.5 mm and more preferably 0.3 mm.

Still further, the material of the supporting members 30 should preferably be such that its Young's modulus will be enough to suppress the deflection of the portion where the slits 20 are formed against the internal pressure within the cavity 6 and that its coefficient of thermal expansion will be substantially the same as those of the fixed die 3 and the movable die 4. For example, the same material as the fixed die 3 and the movable die 4 will be preferable to employ.

If the coefficient of thermal expansion of the supporting member 30 is too small as compared to the fixed die 3 and the movable die 4, then the other end of the supporting member 30 will come apart from the bottom of the slit 20 when the injection molding is performed, thereby making it difficult to support such portions where the slits 20 are formed. On the other hand, if the coefficient of thermal expansion is too large as compared to the fixed die 3 and the movable die 4, then too large a force from the supporting member 30 will be imposed on the bottom 20b of the slit 20, thereby enlarging the deflection of the fixed die 3 and the movable die 4 as well.

Figure 7A:
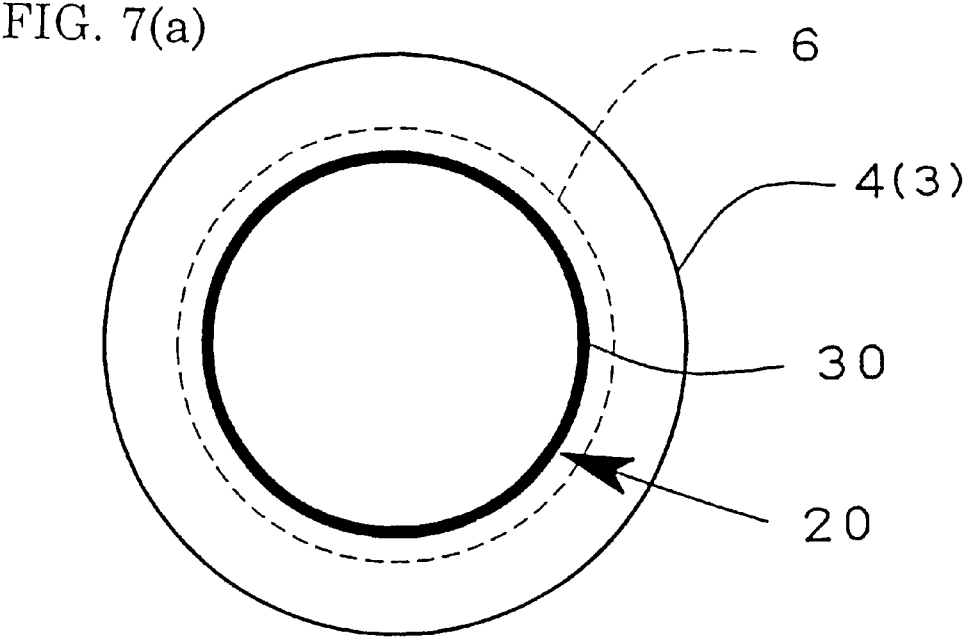
FIGS. 7(a) and 7(b) are plan views indicating how the supporting members are positioned.
Figure 7B:
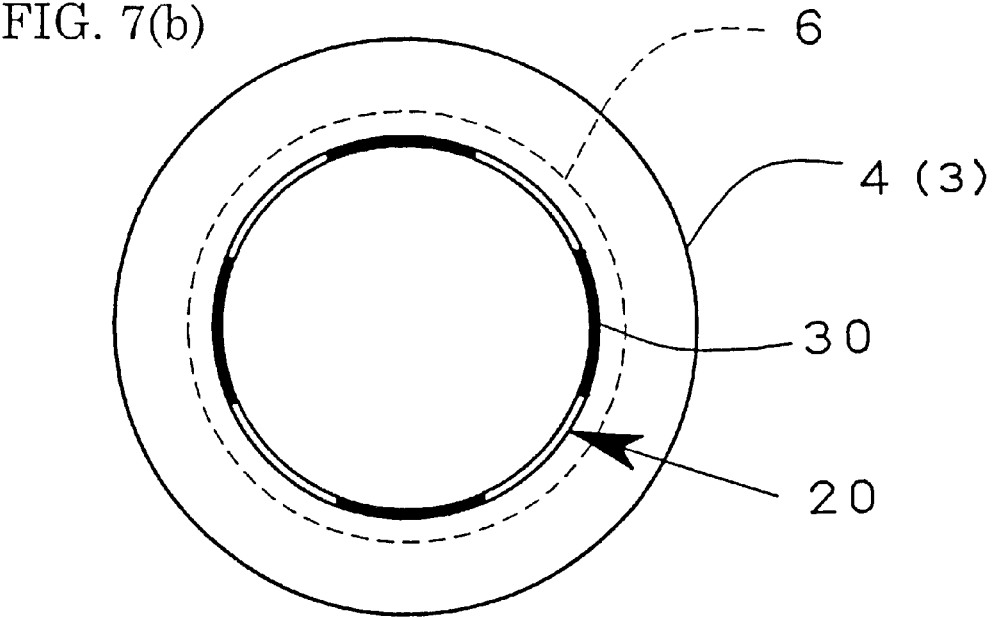

FIG. 7 is a plan view indicating how the supporting members 30 are positioned.

As shown in FIG. 7(*a*), the supporting member 30 may be preferably provided throughout the slit 20. As long as it is possible to suppress the deflection of the portion where the slits 20 are formed, it is also possible to provide a plurality of, for example four, the supporting members 30 at predetermined intervals, or preferably at equal intervals, on the slit 20.

EXAMPLE

Some experimental results will now be explained using comparative examples, wherein an ultrasonic injection mold for an optical disk in accordance with the second embodiment of the present invention is employed.

(1) The maximum and minimum values of the deflection is measured in the second embodiment under such conditions wherein the supporting members 30 are provided as shown in FIG. 5, the faucet method is employed as the guidance method in clamping and separating the fixed die 3 and the movable dies 4, and the ultrasonic with the frequency of 19 KHz is outputted from the oscillator. The results are as follows:
The internal pressure of the mold: 5.5 MPa
The deflection of the mold: Maximum: 7 μm; Minimum: 1 R (2) The maximum and minimum values of the deflection is measured as a third comparative example under such conditions wherein the guidance method is the same as above, the supporting members 30 are provided, and no ultrasonic is outputted. The results are as follows:
The third example (with the supporting members; no ultrasonic outputted)
The internal pressure of the mold: 8.7 MPa
The deflection of the mold: Maximum: 14 μm; Minimum: 2μ

(3) The maximum and minimum values of the deflection is measured as a fourth comparative example under the same conditions except that no supporting members are provided. The results are as follows:
The fourth example (no supporting members; no ultrasonic outputted)
The internal pressure of the mold: 8.7 MPa
The deflection of the mold: Maximum: 22 μm; Minimum: 12μ

As is clear from what has been described, if the supporting members 30 is provided and the ultrasonic is applied, then it has been possible to decrease the deflection of the dies 3 and 4.

THIRD EMBODIMENT

The third embodiment of the present invention will now be described by referring to FIG. 8.

Figure 8:
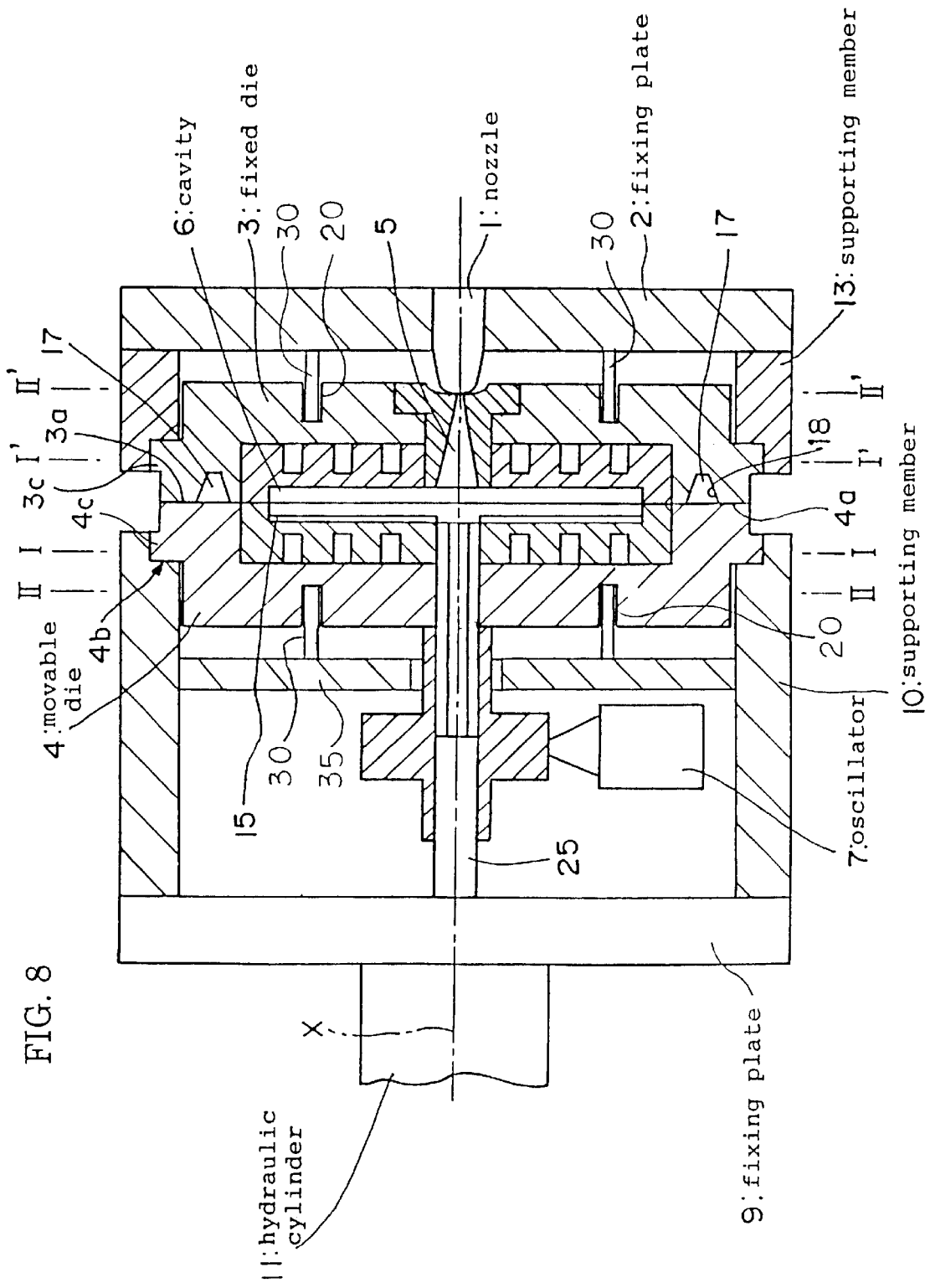
FIG. 8 is a partially cross-sectional schematic view of an ultrasonic injection mold for an optical disk in accordance with a third embodiment of the present invention.

FIG. 8 is a partially cross-sectional schematic view of an ultrasonic injection mold for an optical disk in accordance with a third embodiment of the present invention.

In this embodiment, in the neighborhood of the movable die 4, an attachment plate 35 is provided as opposed to movable die 4. This attachment plate 35 is securely fixed onto the supporting member 30 by bolts or welding. The other end of the supporting member 30 is fixed to this attachment plate 35. Then, as in the second embodiment, one end of the supporting member 30 is inserted into the slit 20 and in contact with bottom 20b of the slit 20.

By providing the attachment plate 35 in the neighborhood of the movable die 4, it may be possible to make the length of the supporting member 30 on the side of the movable die 4 be shorter than the supporting member 30 in the second embodiment. Thus, the compressive strain of the supporting member 30 in the axial direction when the injection molding is performed will be smaller, so that the strain of the portion where the slits 20 are formed will be smaller.

In accordance with the present invention, the amplitude of the oscillations to be transferred in the radial direction of the cavity can effectively be decreased; the flow of the melted resin can be kept in an appropriate condition so that the transferability will be kept appropriate; and the generation of birefringence and the compressive deformation will be prevented. Further, the oscillation loss from the mold is prevented as little as possible so that the states of the mold and the nozzle will be kept appropriate.

Still further, since the bottoms of the slits formed on the mold are supported with the supporting members and the internal pressure of the mold may be lowered by applying the ultrasonic, the deflection of the mold because of the decrease of its thickness will be kept to the minimum, thereby obtaining optical disks with small changes in thickness.

INDUSTRIAL AVAILABILITY

The present invention is particularly suitable to the injection molding of thin and circular optical disks. The present invention may be applicable to the injection molding of not only CD's and DVD's but other optical disks such as MO's and LD's (laser disks).

What is claimed is:

1. An ultrasonic injection mold for an optical disk comprising:
a movable die and a fixed die;
a disk molding cavity formed on contacting surfaces of the movable die and the fixed die;
a stamper positioned at a bottom of the cavity for forming convexes and concaves on a surface of the disk;
ultrasonic generation means provided on the movable die or the fixed die for applying ultrasonic waves to the cavity in performing injection molding; and
one or more slits formed on each side of the movable die and the fixed die opposite to a side where the cavity is formed, the one or more slits being oriented in a direction which crosses a radial direction of the cavity to reduce an amplitude of oscillations generated by the ultrasonic generation means and transferred in the radial direction of the cavity.

2. The ultrasonic injection mold for an optical disk according to claim 1, wherein the one or more slits are formed at a radial distance of $n\lambda/4$ from a center of the molding cavity where the ultrasonic waves are applied into the movable die or the fixed die, wherein $\lambda$ is a wavelength of the ultrasonic waves transmitted in the radial direction of the cavity and n is an odd number integer.

3. The ultrasonic injection mold for an optical disk according to claim 1, wherein a plurality of slits is formed at an area from a periphery of the cavity to its inside.

4. The ultrasonic injection mold for an optical disk according to claim 1, further comprising an oscillation direction converter having an input end and an output end connected to an ultrasonic input of the movable die or the fixed die, said ultrasonic generation means being provided at the input end.

5. The ultrasonic injection mold for an optical disk according to claim 1, further comprising product separation means positioned on either of the movable die and an oscillation direction converter to which the ultrasonic generation means is provided or the fixed die for separating an injection molded product from the cavity.

6. The ultrasonic injection mold for an optical disk according to claim 5, wherein the product separation means separates the product from the cavity by oscillating the movable die or the fixed die that has the stamper.

7. The ultrasonic injection mold for an optical disk according to claim 1, further comprising punch means provided on the movable die and an oscillation direction converter on which the ultrasonic generation means is provided or the fixed die for punching a predetermined position of an injection molded product.

8. The ultrasonic injection mold for an optical disk according to claim 1, wherein the movable die and the fixed die in fixing and opening the mold are guided by faucet guidance means.

9. The ultrasonic injection mold for an optical disk according to claim 1, wherein the ultrasonic generation means generates oscillations throughout the fixed and movable dies in the radial direction of the cavity as well as in a longitudinal direction thereof.

10. The ultrasonic injection mold for an optical disk according to claim 1, wherein a supporting member is inserted into the one or more slits and a bottom of the one or more slits is supported by one end of the supporting member in performing injection molding.

11. The ultrasonic injection mold for an optical disk according to claim 10, wherein a distance t between the supporting member and an internal wall of the one or more slits is 0.1 mm<t<0.3 mm.

12. The ultrasonic injection mold for an optical disk according to claim 10, wherein the other end of the supporting member is provided on a fixing member that fixes the fixed die or a fixing member that fixes the movable die.

13. The ultrasonic injection mold for an optical disk according to claim 10, wherein a mounting member is provided adjacent to the fixed die or the movable die so that the supporting member is provided on the mounting member.

14. The ultrasonic injection mold for an optical disk according to claim 1, wherein each of said movable die and said fixed die having the die cavity is formed of one member in which said one or more slits are dented.

* * * * *